US011939454B2

(12) United States Patent
Fihri et al.

(10) Patent No.: US 11,939,454 B2
(45) Date of Patent: Mar. 26, 2024

(54) DENDRITIC FIBROUS MATERIALS-BASED POLY(METHYL METHACRYLATE) AND METHODS OF PREPARATION

(71) Applicant: SAUDI ARABIAN OIL COMPANY, Dhahran (SA)

(72) Inventors: Aziz Fihri, Paris (FR); Haleema Alamri, Thuwal (SA); Yassine Malajati, Beachwood, OH (US); Enrico Bovero, Dhahran (SA); Mohamed Bouhrara, El Jadida (MA); Hussain Tuwailib, Alqatif (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 412 days.

(21) Appl. No.: 17/180,211

(22) Filed: Feb. 19, 2021

(65) Prior Publication Data

US 2022/0267571 A1    Aug. 25, 2022

(51) Int. Cl.
*C08K 9/06* (2006.01)
*C08J 5/18* (2006.01)
*C08K 3/36* (2006.01)

(52) U.S. Cl.
CPC ...... *C08K 9/06* (2013.01); *C08J 5/18* (2013.01); *C08K 3/36* (2013.01); *C08J 2333/12* (2013.01); *C08K 2201/003* (2013.01); *C08K 2201/011* (2013.01)

(58) Field of Classification Search
CPC ...... C08K 3/36; C08K 9/06; C08K 2201/003; C08K 2201/011; C08J 5/18; C08J 2333/12
See application file for complete search history.

(56) References Cited

U.S. PATENT DOCUMENTS

| | | | |
|---|---|---|---|
| 9,006,345 | B2 | 4/2015 | Lancaster et al. |
| 11,807,739 | B2 * | 11/2023 | Fihri ............ C08F 20/14 |
| 2013/0112618 | A1 | 5/2013 | Diallo et al. |
| 2013/0209795 | A1 | 8/2013 | Liu |
| 2014/0349061 | A1 | 11/2014 | Sikka et al. |
| 2014/0373915 | A1 | 12/2014 | Saito et al. |
| 2015/0200319 | A1 | 7/2015 | Miyamura et al. |
| 2016/0088756 | A1 | 3/2016 | Ramadas |
| 2019/0265247 | A1 | 8/2019 | Yu |
| 2019/0302925 | A1 | 10/2019 | Ogumi et al. |

FOREIGN PATENT DOCUMENTS

| | | |
|---|---|---|
| CN | 103730531 A | 4/2014 |
| WO | 2013/018378 A1 | 2/2013 |

OTHER PUBLICATIONS

MarketsandMarkets, "Polymethyl Methacrylate (PMMA) Market worth 5.56 Billion USD by 2021"; Market Research Report; Aug. 1, 2016; <https://www.marketsandmarkets.com/PressReleases/polymethyl-methacrylate.asp>; Accessed Feb. 13, 2020 (6 pages).
Pawar, Eshwar, "A Review Article on Acrylic PMMA"; IOSR Journal of Mechanical and Civil Engineering (IOSR-JMCE); vol. 13, Issue 2, Version I; pp. 1-4, Mar.-Apr. 2016 (4 pages).
Grand View Research, "Polycarbonate Market Size Worth $25.37 Billion by 2024"; Oct. 2016; <https://www.grandviewresearch.com/press-release/global-polycarbonate-market>; Accessed Feb. 13, 2020 (6 pages).
Vaia, Richard A. et al., "Polymer Nanocomposites with Prescribed Morphology: Going beyond Nanoparticle-Filled Polymers"; Chemistry of Materials; vol. 19, No. 11; pp. 2736-2751; Apr. 21, 2007 (16 pages).
Schadler, Linda S. et al., "Designed Interfaces in Polymer Nanocomposites: A Fundamental Viewpoint"; MRS Bulletin, vol. 32, Issue 4: Polymer Nanocomposites: pp. 335-340; Apr. 2007 (6 pages).
Mu, Bin et al., "Well-Defined Dendritic-Graft Copolymer Grafted Silica Nanoparticle by Consecutive Surface-Initiated Atom Transfer Radical Polymerizations"; Industrial & Engineering Chemistry Research; vol. 46, No. 10; pp. 3069-3072; Apr. 10, 2007 (4 pages).
Wang, Yulu et al., "Dendritic Silica Particles with Well-Dispersed Ag Nanoparticles for Robust Antireflective and Antibacterial Nanocoatings on Polymeric Glass"; ACS Sustainable Chemistry & Engineering; vol. 6, No. 11; pp. 14071-14081; Sep. 25, 2018 (11 pages).
Wang, Yabin et al., "Dendritic fibrous nano-particles (DFNPs): rising stars of mesoporous materials"; Journal of Materials Chemistry A; vol. 7, Issue 10; pp. 5111-5152; Jan. 7, 2019 (42 pages).

(Continued)

*Primary Examiner* — Edward J Cain
(74) *Attorney, Agent, or Firm* — Osha Bergman Watanabe & Burton LLP

(57) ABSTRACT

Nanocomposite compositions and methods for preparing nanocomposite compositions films are provided. The nanocomposite compositions include dendritic fibrous nanoparticles that have a diameter ranging from 50 to 500 nm, and a polymer matrix comprising poly(methyl methacrylate) (PMMA), where dendritic fibrous nanoparticles are dispersed within the polymer matrix, and where the PMMA is bound to the surface of the dendritic fibrous nanoparticles. Methods of preparing nanocomposite compositions and nanocomposite films including the nanocomposite compositions may include introducing dendritic fibrous nanoparticles into a mixture with a poly(methyl methacrylate) in a solution to form a composite solution.

9 Claims, 4 Drawing Sheets

(56) References Cited

OTHER PUBLICATIONS

Chujo, Yoshiki et al., "Organic Polymer Hybrids with Silica Gel Formed by Means of the Sol-Gel Method"; Macromolecules: Synthesis, Order and Advanced Properties; Advances in Polymer Science, vol. 100; pp. 11-29; 1992 (19 pages).
Novak, Bruce M., "Hybrid Nanocomposite Materials-Between Inorganic Glasses and Organic Polymers"; Advanced Materials; vol. 5, Issue 6; pp. 422-433; Jun. 1993 (12 pages).
Kim, Hyunwoo et al., "Processing-property relationships of polycarbonate/graphene composites"; Polymer; vol. 50, Issue 15; pp. 3797-3809; Jul. 17, 2009 (13 pages).
Cai, Hualun et al., "Preparation and properties of polycarbonate/polyhedral oligomeric silsesquioxanes (POSS) hybrid composites"; Polymers Advanced Technologies; vol. 23, Issue 4; pp. 765-775; Apr. 25, 2011 (11 pages).
Motaung, T.E. et al., "The effect of silica nanoparticles on the morphology, mechanical properties and thermal degradation kinetics of polycarbonate"; Composites Science and Technology; vol. 73; pp. 34-39; Nov. 23, 2012 (6 pages).
Feng, Yuezhan et al., "Effects of modified silica on morphology, mechanical property, and thermostability of injection-molded polycarbonate/silica nanocomposites"; Journal of Reinforced Plastics and Composites; vol. 33, Issue 10; pp. 911-922; May 2014 (12 pages).
Han, Xiaohang et al., "Preparation and characterization of long chain branched polycarbonates with significantly enhanced environmental stress cracking behavior through gamma radiation with addition of difunctional monomer"; Polymer Chemistry; vol. 7, Issue 21; pp. 3551-3561; May 3, 2016 (11 pages).
Phua, Y. J. et al., "Injection Molded Short Glass and Carbon Fibers Reinforced Polycarbonate Hybrid Composites: Effects of Fiber Loading"; Journal of Reinforced Plastics and Composites; vol. 29, Issue 17; pp. 2592-2603; Sep. 2010 (12 pages).
Lee, Long-Hua et al., "High-Refractive-Index Thin Films Prepared from Trialkoxysilane-Capped Poly(methyl methacrylate)-Titania Materials"; Chemistry of Materials; vol. 13, Issue 3; pp. 1137-1142; Mar. 2001 (6 pages).
Rashahmadi, Samrand et al., "Improving the Mechanical Properties of Poly Methyl Methacrylate Nanocomposites for Dentistry Applications Reinforced with Different Nanoparticles"; Polymer-Plastics Technology and Engineering; vol. 56, Issue 16; pp. 1730-1740; Apr. 19, 2017 (11 pages).
Thomassin, Jean-Michel et al., "Poly(methyl methacrylate)/Graphene Oxide Nanocomposites by a Precipitation Polymerization Process and Their Dielectric and Rheological Characterization"; ACS Publications: Macromolecules; vol. 47, Issue 6; pp. 2149-2155; Mar. 14, 2014 (7 pages).
Mbese, Johannes Z. et al., "Preparation and Characterization of ZnS, CdS and HgS/Poly(methyl methacrylate) Nanocomposites"; MDPI Open Access Journals: Polymers; vol. 6, Issue 9; pp. 2332-2344; Sep. 5, 2014 (14 pages).
Zhao, Fan et al., "Nanoparticle decorated fibrous silica membranes exhibiting biomimetic superhydrophobicity and highly flexible properties"; RSC Advances; vol. 1; Issue 8; pp. 1482-1488; Oct. 21, 2011 (7 pages).
Ding, Bin et al., "Fabrication of a super-hydrophobic nanofibrous zinc oxide film surface by electrospinning"; Thin Solid Films; vol. 516, Issue 9; pp. 2495-2501; Mar. 3, 2018 (7 pages).
Dong, Zhengping et al., "Silver nanoparticles immobilized on fibrous nano-silica as highly efficient and recyclable heterogeneous catalyst for reduction of 4-nitrophenol and 2-nitroaniline"; Applied Catalysis B: Environmental; vols. 158-159; pp. 129-135; Oct. 2014 (7 pages).
Polshettiwar, Vivek et al., "High-Surface-Area Silica Nanospheres (KCC-1) with a Fibrous Morphology"; Angewandte Chemie International Edition; vol. 49, Issue 50; pp. 9652-9656; Dec. 10, 2010 (5 pages).
Fihri, Aziz et al., "Decorated fibrous silica epoxy coating exhibiting anti-corrosion properties"; Progress in Organic Coatings; vol. 127; pp. 110-116; Feb. 2019 (7 pages).
He, Huiwen et al., "High transparency and toughness PMMA nanocomposites toughened by self-assembled 3D loofah-like gel networks: fabrication, mechanism, and insight into the in situ polymerization process"; RSC Advances; vol. 6, Issue 41; pp. 34685-34691; Mar. 22, 2016 (7 pages).
Chen, Si et al., "High Toughness and Light Transmittance of PMMA Composite Prepared via In-Situ Polymerization with Incorporating Self-Assembled Dendritic Gel Networks"; Journal of Macromolecular Science, Part A: Pure and Applied Chemisty; vol. 51, Issue 2; pp. 173-179; Jan. 24, 2014 (7 pages).
Stojanović, Dušica B. et al., "Hybrid acrylic nanocomposites with excellent transparency and hardness/toughness balance"; Progress in Organic Coatings; vol. 139, Article 105437; pp. 1-8; Feb. 2020 (8 pages).
Marouf, Bahereh T. et al., "Toughening of Epoxy Nanocomposites: Nano and Hybrid Effects"; Polymer Reviews; vol. 56, Issue 1; pp. 70-112; Mar. 7, 2016 (43 pages).
Chantarachindawong, Rojcharin et al., "Development of the Scratch Resistance on Acrylic Sheet With Basic Colloidal Silica (SIO2)-Methyltrimethoxysilane (MTMS) Nanocomposite Films by Sol-Gel Technique"; The Canadian Journal of Chemical Engineering; vol. 90, Issue 4; pp. 888-896; Aug. 2012 (9 pages).
Office Action issued in related U.S. Appl. No. 17/180,165 dated Jun. 8, 2023 (45 pages).

\* cited by examiner

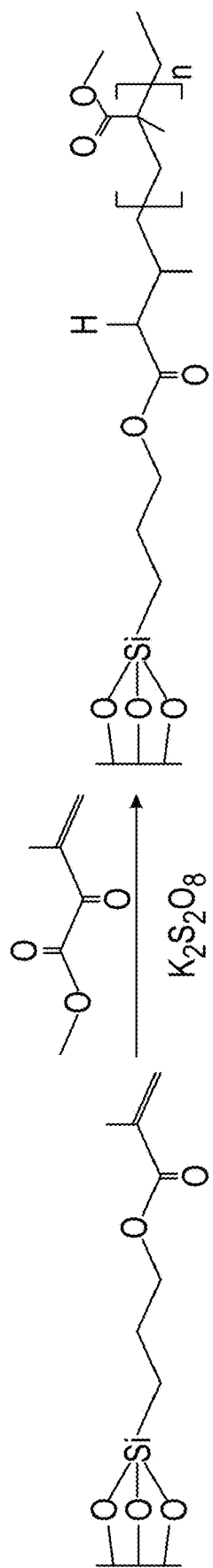
FIG. 5
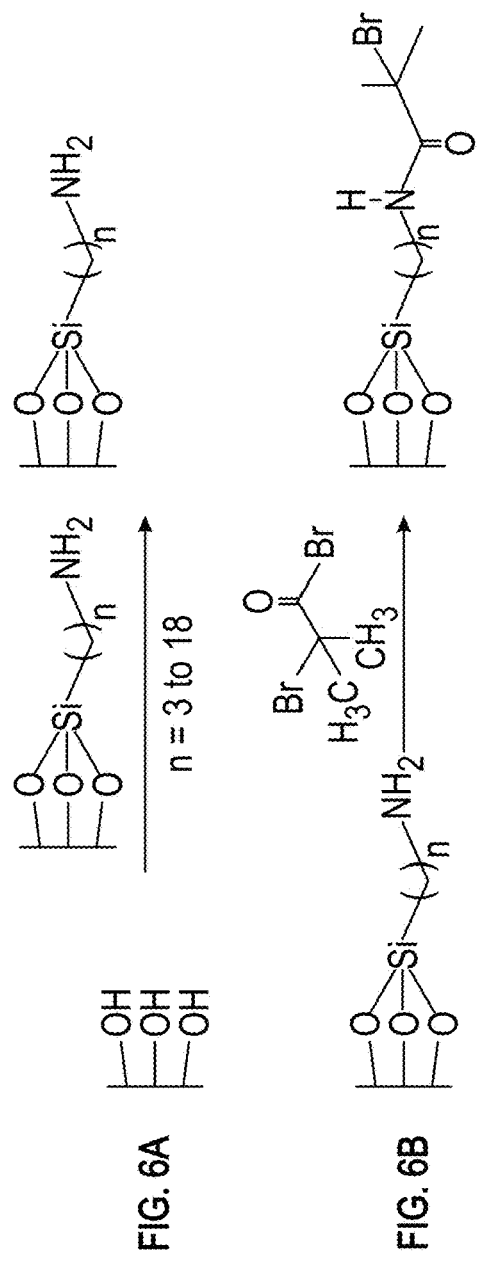
FIG. 6A
FIG. 6B

DENDRITIC FIBROUS MATERIALS-BASED POLY(METHYL METHACRYLATE) AND METHODS OF PREPARATION

BACKGROUND

Polymeric composite materials have been studied for use in a variety of applications resulting from a combination of properties that cannot be attained by metals, ceramics or polymers alone. Polycarbonate (PC) and poly(methyl methacrylate) (PMMA) have been broadly investigated as polymers for applied and fundamental research. PMMA has been used as an alternative to PC when tensile strength, flexural strength, transparency, polishability, and ultraviolet (UV) tolerance are significant properties in the resulting product. The optical clarity of these two polymers is relatively greater to other common thermoplastics. For this reason, these two polymers have been exploited in several applications, including electronic appliances, automobile, safety equipment, architecture, and aerospace, such as aircraft components. However, certain properties of the resulting PMMA or PC composites, such as brittleness and reduced scratch resistance, limit their ultimate application and use.

Numerous studies have focused on poly(methyl methacrylate) (PMMA) and polycarbonate hybrid materials prepared by direct mixing of the polymer and inorganic particles either in solution by using solvents (that is, solvent mixing method) or in the absence of solvents (for example, melt-compounding method). However, these two processes could lead to aggregation of nanoparticles that could significantly reduce the mechanical and optical properties of the transparent base polymers.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to a nanocomposite composition that includes dendritic fibrous nanoparticles. The nanocomposite composition may include dendritic fibrous nanoparticles that have a diameter ranging from 50 to 500 nm (nanometers) and a polymer matrix comprising poly(methyl methacrylate) (PMMA). The nanocomposite composition may include the dendritic fibrous nanoparticles and may be dispersed within the polymer matrix. The nanocomposite composition may further include dendritic fibrous nanoparticles where the PMMA is bound to the surface of the dendritic fibrous nanoparticles.

In a further aspect, embodiments disclosed here relate to methods for preparing a nanocomposite film that includes functionalizing dendritic fibrous nanoparticles with a methacrylate linker molecule coating. The method may include dendritic fibrous nanoparticles that have a diameter ranging from 50 to 500 nm. The method may further include mixing dendritic fibrous nanoparticles with methyl methacrylate in an organic solvent to form a composite solution. The method may include polymerizing methyl methacrylate in-situ, wherein the methyl methacrylate is bound by the linker molecule and is polymerized to form a PMMA matrix.

In another aspect, embodiments disclosed relate to methods for preparing a nanocomposite film where the method includes functionalizing dendritic fibrous nanoparticles with an amino terminated linker molecule and where the diameter of the dendritic fibrous particles may range from 50 to 500 nm. The method may include steps of mixing the amino terminated dendritic fibrous nanoparticles in a solution with an activator to form a reactive coating on the functionalized dendritic fibrous nanoparticle. The method may also include steps of polymerizing methyl-methacrylate (MMA) through atom transfer radial polymerization (ATRP) to form a PMMA matrix with the dendritic fibrous nanoparticles dispersed within the PMMA matrix, where the MMA is bound to the dendritic fibrous nanoparticle in the polymerization reaction.

Other aspects and advantages of the disclosure will be apparent from the following description and the appended claims.

BRIEF DESCRIPTION OF DRAWINGS

FIG. 5 is a representation of the polymerization of PMMA from the MPTMS linker molecule tethered to the DFNs surface.

FIGS. 6A-6B are a representation of sequential steps for modifying the DFNs surface with (FIG. 6A) an amino-silane linker molecule and the (FIG. 6B) subsequent reaction of the primary amine with an atom transfer radical polymerization (ATRP) reaction initiator to form polymerization initiator coated DFNs.

DETAILED DESCRIPTION

Figure 1:
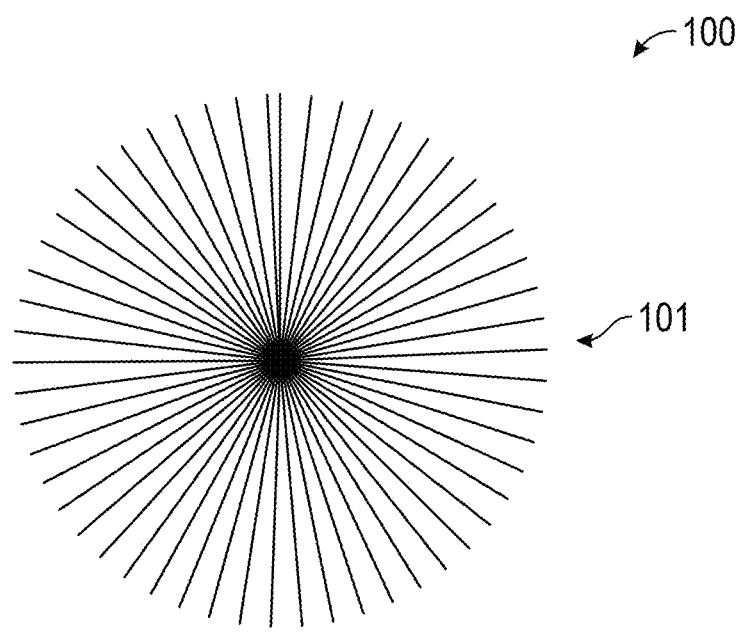
FIG. 1 is a representation of a dendritic fibrous nanoparticle (DFN) prepared in accordance with one or more embodiments of the present disclosure.

In solar cells, the challenge of the development of power generation lies in how to improve the existing manufacturing process and the design and preparation of relevant materials for solar cells and modules. For example, the incoming sunlight from the front glass sheet passes through the glass sheet to reach the solar cell sheet where it is converted to electric energy. The transmittance, scratch resistance, and impact resistance of the glass sheet is critical to ensure sufficient incident light can reach the cell sheet.

Embodiments of the present disclosure are directed to nanocomposite compositions that contain a polymer matrix and dendritic fibrous nanoparticle (DFN) additives that may be used to improve the properties, including, but not limited to, scratch resistance and impact resistance, of the primary polymer matrix of the composition and articles thereof.

The nanocomposite composition may include a matrix polymer of a thermoplastic transparent polymer and a plurality of DFNs dispersed in the polymer matrix. The plurality of DFNs may be modified with a coating to improve dispersion of the particles within the polymer matrix without limiting or adversely affecting the mechanical properties of the base polymer matrix. The polymeric matrix may be polymerized from, or linked to, the surface of the DFNs particles to form nanocomposite compositions in accordance with the present disclosure. Such nanocomposite compositions may exhibit improvements in scratch resistance and impact resistance while also maintaining a balance of mechanical and optical properties provided by the base polymer matrix.

In one or more embodiments, nanocomposite compositions may include selected amounts of DFNs to adjust various physical and chemical properties of the final composition. Specifically, in one or more embodiments, physical and chemical properties of a base matrix polymer may be modified by polymerizing MMA with various sizes and amount of modified DFNs. The DFNs may be functionalized or "modified" with an organosilane coating that may serve to link the polymeric matrix with the surface of the DFNs. In some embodiments, the modified DFNs may provide a surface for grafting polymers of the polymer matrix from the DFNs.

In one or more embodiments, the functionalized DFNs may be added as a scratch resistance improving agent in the nanocomposite composition. Processes of manufacturing films of the nanocomposite compositions in accordance with the present disclosure may include various methods, including in-situ polymerization coupled with solution casting or melt compounding and extrusion. Polymer-based hybrid materials prepared in accordance with one or more embodiments of the present disclosure may be applicable to electronic devices, high refractive index materials, electroluminescent materials, solar cells, and thin film transistors, for example.

Base-Polymer Matrix

Nanocomposite compositions in accordance with the present disclosure may include a matrix polymer component that surrounds other components in the composition, including DFNs and other additives.

One or more embodiments of the present disclosure relates to nanocomposite compositions containing a thermoplastic base-polymer matrix in which DFNs may be dispersed. The thermoplastic polymer matrix may be characterized as a transparent thermoplastic polymer, such as PMMA, polycarbonate, or a combination thereof. In one or more embodiments, the thermoplastic polymer matrix may be comprised of a transparent non-polar polymer, such as PMMA. The PMMA polymer matrix may be bound to the surface of the DFNs particle through a linker molecule or via a linker molecule and a polymerization initiator. In one or more embodiments, the PMMA may be polymerized in-situ where it may be bound to the surface of modified DFNs, polymerized from the surface of the DFNs, or both. The resulting PMMA polymer matrix may also stabilize the DFNs dispersed within the matrix.

In one or more embodiments, polymer compositions may comprise a percent by weight of the total composition (wt %) of matrix polymer ranging from a lower limit of 95 to and upper limit of 99.9 wt %. For example, the nanocomposite composition may contain PMMA in an amount ranging from a lower limit selected from one of 95, 96, 97, 97.5, 98, 98.2, 98.5, 98.8, 99, and 99.2 wt %, to an upper limit selected from one of 97, 97.5, 98, 98.2, 98.5, 98.8, 99, 99.2, 99.5, 99.7 and 99.9 wt %, where any lower limit can be used in combination with any mathematically feasible upper limit.

The nanocomposite composition according to the present disclosure may include a poly(methyl methacrylate) (PMMA) polymer. A "polymer" may include a homopolymer or a copolymer, where a "copolymer" comprises a plurality of types of monomers. The PMMA polymer may have a weight average molecular weight of at least 600 grams per mole. In some embodiments, the PMMA polymer may have a weight average molecular weight of at least 600 grams per mole, 1,000 grams per mole, 5,000 grams per mole, 10,000 grams per mole, 50,000 grams per mole, 100,000 grams per mole, or 500,000 grams per mole. The PMMA polymer may have a weight average molecular weight of up to 500,000 grams per mole, and in some embodiments up to 1,000,000 grams per mole, and in some embodiments up to more than 1,500,000 grams per mole. It should generally be understood that the PMMA polymer is a linear polymer.

In one or more embodiments where the PMMA polymer is a copolymer, the comonomer(s) of MMA may include, but are not limited to, acrylates, such as n-butyl-acrylate, ethyl acrylate, 2-ethylhexyl acrylate; alkyl methacrylates, such as ethyl methacrylate and butyl methacrylate; acrylic acids and methacrylic acids, and their salts; fluorinated acrylics; styrene; acrylamide; acrylonitrile; and combinations thereof.

Dendritic Fibrous Nanoparticles

Embodiments in accordance with the present disclosure generally relate to compositions and methods including DFNs dispersed within a polymer matrix. One or more embodiments may include DFNs functionalized with an organosilane ligand or linker molecule that may serve as an active group on the surface of the DFNs to form surface modified DFNs.

One or more embodiments of the present disclosure may relate to compositions and methods that include modified DFNs. In one or more embodiments, the DFNs may include, but are not limited to, metals, inorganic oxides, metal oxides, and metalloids, such as silica, titanium oxide, zinc oxide, and zirconium oxide, and combinations thereof. In one or more embodiments, the DFNs may be dendritic fibrous silica nanoparticles.

The dendritic fibrous nanoparticles may be prepared by hydrothermal, sol-gel, electrospinning, hydrothermal microwave assisted techniques, or any other technique known to one skilled in the art.

In one or more embodiments, the DFNs may have a structure that is generally spherical. A singular DFN includes a plurality of fibers that are radially oriented within the DFN. As shown in FIG. 1, the morphology of DFNs 100 is further characterized by the manner in which the fibers 101 radiate out from a core in a flower-like or beaded fiber formation. The microstructure of the DFN includes a high degree of porosity generated by the space between the radiating dendritic fibers. DFNs are characterized by their unique fibrous morphology, large radial pores and dendritic pore networks. DFNs are further characterized by spacious pore volume, a large surface area and a greater number of active sites for further reaction. DFNs are further characterized by their physical properties, including a high surface area, which provides by the extended network of fibrous material excellent thermal and hydrothermal stabilities, and high mechanical stability.

In one or more embodiments, the morphology of the DFNs may vary based on the chemical composition of the particle. The morphology may include shapes such as a flower-type shape or a spherical shape having rods extending from the spherical core. The surface area of the nanoparticles may also vary depending on the morphology of the DFN. The exact dimensions of the DFN may vary depending on the morphology.

Figure 2:
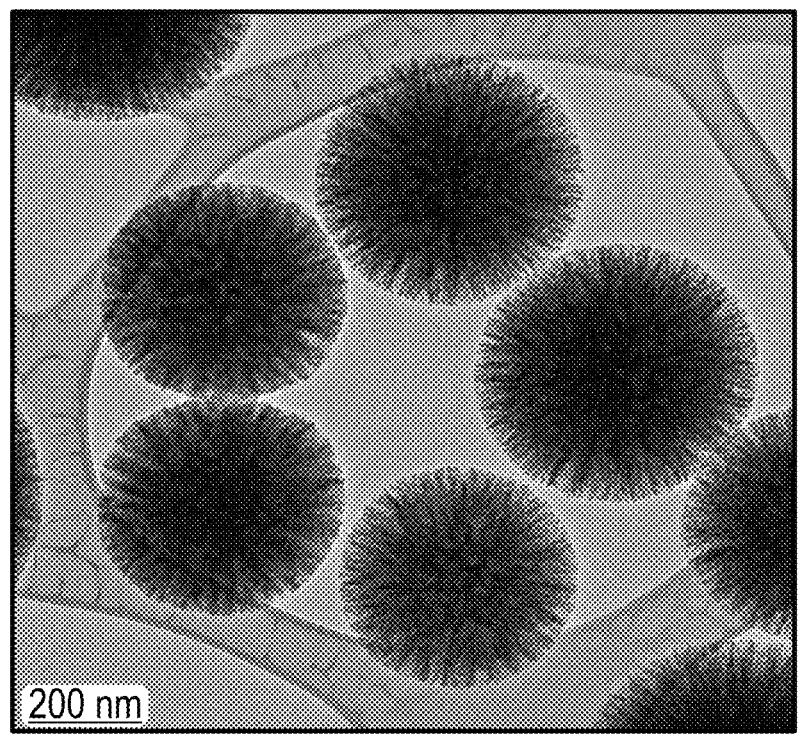
FIG. 2 shows transmission electron microscopy (TEM) images of several DFNs and scale bar for reference.

The physical properties of the DFNs, such as their increased surface area, dimension, and morphology, may yield changes in the properties of nanocomposites comprising DFNs. The transparency of the resulting nanocomposite composition and film may be dependent on the size of the incorporated DFNs. For example, nanocomposite films comprising larger DFNs incorporated within the polymer matrices may be shown to have reduced transparency relative to films with smaller diameter DFNs or films prepared without DFNs. In one or more embodiments, the diameter of the DFNs may range from about 50 nm (nanometers) to about 500 nm as determined by transmission electron microscopy (TEM), as shown in FIG. 2. For example, in one or more embodiments, the nanocomposite composition may contain DFNs with a particle diameter ranging from a lower limit of 50, 75, 100, 125, 150, 200, 250, 300, 325, 350, 380, and 400 nm, to an upper limit of 100, 150, 200, 250, 300, 350, 380, 400, 420, 450, and 500 nm, where any lower limit can be used in combination with any mathematically feasible upper limit.

In one or more embodiments, nanocomposite compositions may contain DFNs in an amount of the range of 0.1 to 5 wt %. For example, the nanocomposite composition may contain the DFNs in an amount ranging from a lower limit of 0.1, 0.3, 0.5, 0.8, 1, 1.2, 1.5, 1.8, 2, 2.5, and 3 wt %, to an upper limit of any of 0.8, 1, 1.2, 1.5, 1.8, 2, 2.5, 3, 4, and 5 wt %, where any lower limit can be used in combination with any mathematically feasible upper limit.

Functionalizing Particles

In one or more embodiments DFNs may be modified via surface functionalization of the DFNs. In one or more embodiments, DFNs may be modified with a ligand, that is, bound to the surface of the DFN to provide an active group on the surface of the DFNs for further reaction. The ligand may be bound to the surface of the DFNs in a manner that provides a coating on the surface of the DFNs. The surface modification of the DFNs may be accomplished, for example, by treating the nanoparticle solution with a ligand containing solution. For example, the ligand may be an organic molecule that includes a silane linker group capable of forming a self-assembled monolayer on the surface of the DFNs. By modifying the surface of the DFNs, DFNs-polymer nanocomposite properties, such as compatibility, dispersibility, and stability, may be improved in the polymer matrix.

Without being bound by any particularly theory, the resulting surface modification of the DFNs may reduce the agglomeration of the DFNs in a polymer matrix. In one or more embodiments, a silane molecule that further includes a terminal or tail group that may be suitable for providing an active group at the DFNs surface for further reaction in the presence of a monomer. For example, the organosilane ligand may be an alkyl organosilane comprising between 4 and 20 carbon atoms and further comprises a methacrylate or a primary amine terminal group. The nature of the particles may be tuned through the described silanization processes to functionalize the DFNs. DFNs may be reacted with and subsequently coated by alkyl terminated organosilanes with different alkoxy-, dialkoxy-, trialkoxy-, and trichloro-derivatives, that serve to link the DFNs to the ligand molecules. This reaction may be conducted in toluene, bicyclohexane, or any common suitable organic solvent that may be conventionally used.

The linker can be used in the form of a diluted solution prepared by using such a solvent and is generally used in the form of an aqueous solution. The degree of DFNs surface silanization may influence the surface properties of the modified DFNs as well as the final product design, production processes, and properties. As for the specific linker concentration, any appropriate concentration may be used. For example, a linker solution having a concentration of 0.001% to 20.0% volume by volume (v/v %) relative to the volume of the solvent may be added to the solution for preparing the hydrophobic DFNs.

In one or more embodiments, the modified DFNs may be further reacted with an initiator to form initiator coated DFNs. For example, in one or more embodiments, DFNs may be synthesized and modified with an amino-silane, such as (3-aminopropyl)triethoxysilane (APTES). The modified DFNs may then be further reacted with an initiator, such as 2-bromoiobutyryl bromide, to form the initiator coated modified DFNs. The additional coating may serve as an active site to initiate radical polymerization of polymers from the DFN surface in specific polymerization reactions.

Additives

Nanocomposite compositions in accordance with the present disclosure may optionally further comprise one or more additives that may modify various physical and chemical properties of the composition. Such additives may be selected from, for example, flow lubricants, antistatic agents, clarifying agents, nucleating agents, beta-nucleating agents, slippage agents, antioxidants, antacids, light stabilizers, infrared (IR) absorbers, ultraviolet (UV) absorbers, plasticizers, impact modifiers, anti-hydrolysis additives, organic dyes, organic pigments, inorganic dyes, inorganic pigments, and combinations thereof. One of ordinary skill in the art will appreciate that the choice of additive may be dependent upon the intended use of the composition and articles produced therefrom. It will also be appreciated that such additives are not limited to those described.

In one or more embodiments, nanocomposite compositions may contain a percent by weight of the total composition (wt %) of one or more additives ranging from a lower limit selected from one of 0.001 wt %, 0.01 wt %, 0.05 wt %, 0.5 wt %, and 1 wt %, to an upper limit selected from one of 1.5 wt %, 2 wt %, 5 wt %, and 7 wt %, where any lower limit can be used with any upper limit.

Nanocomposite compositions in accordance with embodiments of the present disclosure will generally possess physical properties suitable for the intended use of the composition and the articles produced therefrom. One of ordinary skill in the art with the benefit of this present disclosure will appreciate that altering the relative amounts and identities of the components of a polymer composition will influence the resulting properties of the composition.

Method for Preparing Nanocomposite Compositions

Nanocomposite compositions in accordance with the present disclosure may be prepared by a number of possible blending and formulation techniques, which will be described in the following sections. The nanocomposite compositions may be prepared by any known process for subsequent film and substrate formulation, such as in-situ polymerization, micro-emulsion polymerization, and atom transfer radical polymerization. Nanocomposites comprising the polymerized PMMA with dispersed DFNs may be further prepared into articles, such as a film, through techniques, such as solution casting and compounding, and other suitable manufacturing processes.

In particular, nanocomposites of modified DFNs and a polymer matrix may be prepared through various polymerization techniques. Methods of one or more embodiments of the present disclosure include preparing DFN filled polymer compositions by polymerizing PMMA in solution. The PMMA may also polymerize from the surface of the modified DFNs to produce a nanocomposite composition. The nanocomposite composition may have improved scratch and impact resistance with respect to the base-polymer composition alone. The resulting films may also be transparent. The transparency of the resulting nanocomposite film may not be significantly diminished by the DFNs additives.

The manufacturing methods of nanocomposite compositions of the present disclosure may include suspension polymerization, emulsion polymerization, bulk polymerization, solution polymerization, and atom transfer radical polymerization (ATRP). Polymerization processes of the present disclosure may further include initiators, catalysts, ligands, reducing agents, and solvents. Polymerization initiators, catalysts, ligands, reducing agents, and solvents, may be selected depending on the specific polymerization technique, the combination of DFNs surface modifier, and the polymer matrix monomer.

Preparation of Nanocomposites

Processes of manufacturing nanocomposite compositions in accordance with the present disclosure may include various blends methods, such as solubilization, emulsion, suspension, or extrusion.

In some embodiments, films may be prepared from methyl methacrylate (MMA) monomer that may be polymerized in-situ in the presence of modified DFNs in solution via micro-emulsion. In one or more embodiments, the present disclosure relates to a method for producing nanocomposite polymer films comprising modified DFNs dispersed in solution cast polymer films. The nanocomposite composition may be prepared from MMA monomers that are polymerized in-situ and with DFNs dispersed within the resulting polymerized PMMA matrix.

Figure 3:
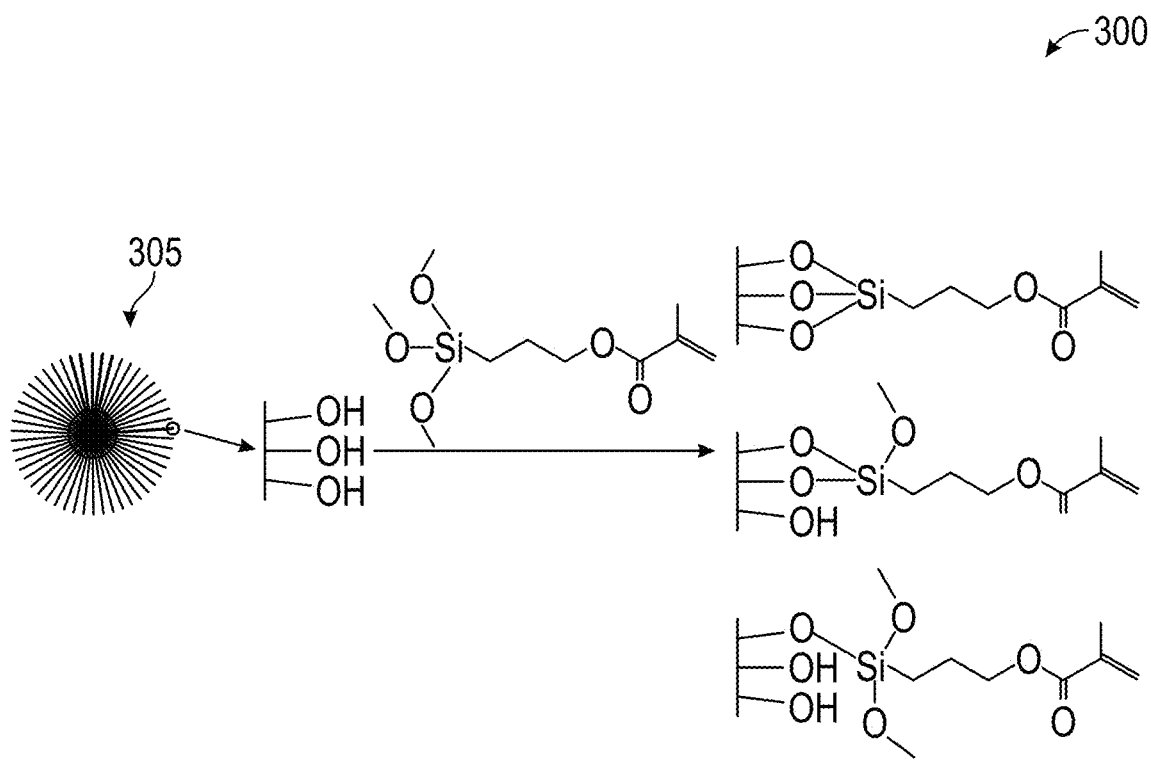
FIG. 3 is a representation of the modification of a singular DFN with methacryloxypropyltrimethoxysilane (MPTMS).

The surface 305 of the DFNs 300 may be modified with an organosilane molecule that includes a polar head group and a methacrylate terminated tail group, such as methacryloxypropyltrimethoxysilane (MPTMS), as shown in FIG. 3.

Figure 4:
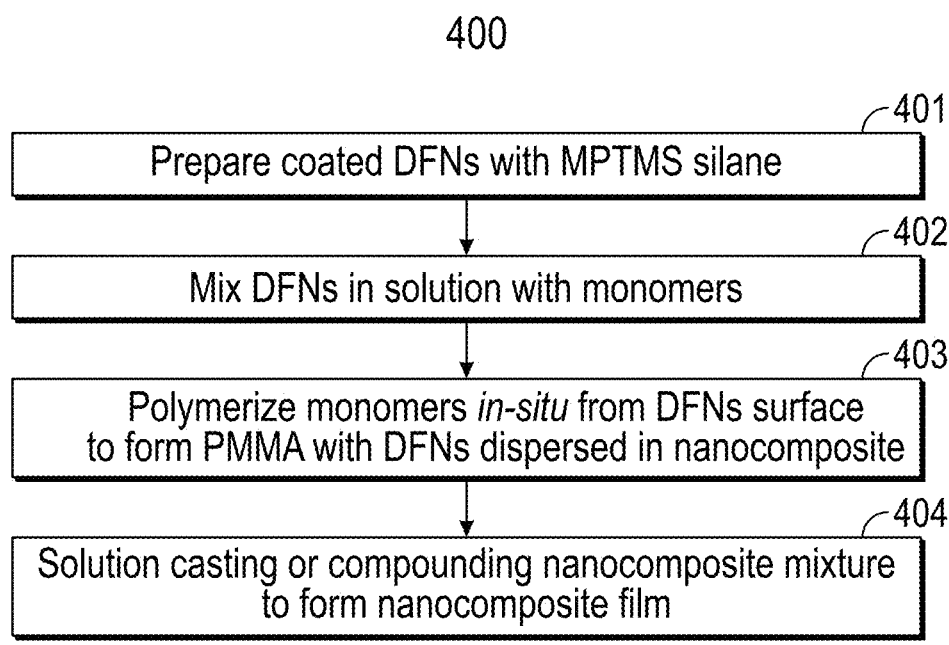
FIG. 4 is a flow chart representation of a method of producing PMMA and DFNs nanocomposites that were coated with MPTMS.

A method 400 of producing PMMA and DFNs nanocomposites that were coated with MPTMS is shown in FIG. 4. As shown in FIG. 4, after the preparation of the DFNs with the MPTMS silane 401, the DFNs may be mixed in solution with liquid MMA monomer 402. The modification of the DFNs can improve the dispersity of the DFNs within the polymer matrix in addition to improving compatibility between the DFNs and the polymer matrix phase. The modified DFNs may be mixed in an aqueous solution comprising MMA monomer followed by the addition of an alkali metal persulfate polymerization initiator, such as potassium persulfate ($K_2S_2O_8$) or azobisisobutyronitrile (AIBN), as shown in FIG. 5. In the method 400 shown in FIG. 4, the mixture may then be reacted and the MMA monomer may be polymerized via mini-emulsion polymerization to form a matrix in which the DFNs are fully dispersed 403. Additionally, the polymer matrix may be bound to the DFNs at a plurality of points by the methacrylate terminated linker molecule. Polymerized PMMA may be bound to and polymerized from the methacrylate active sites of the modified DFNs. The nanocomposite may then be solution cast or melt-compounded and extruded to form a nanocomposite film 404. In some embodiments, the polymerized PMMA and dendritic nanocomposite may be milled or ground before be subjected to a step for preparing a film or layer of the nanocomposite material.

ATRP

In one or more embodiments, the nanocomposite may be prepared through atom transfer radical polymerization (ATRP) to form nanocomposites of DFNs dispersed in a PMMA matrix. In the method of one or more embodiments, a surface-initiated ATRP process is utilized for polymer chains to grow from initiators active sites that were previously anchored to the particle surface.

ATRP may be employed to control free-radical polymerization by the reversible activation/deactivation of growing chains. In ATRP reactions, a small amount of the chains remain active during the progressing reaction while the majority of the chains await reactivation. Thus, the concentration of free-radical species is kept low and the termination processes are suppressed. The suppression of the termination process may provide for controlled molecular weights and low polydispersities of the PMMA polymer of the final produced nanocomposites.

Reaction equilibrium in ATRP can be maintained by the reversible cleavage of a carbon halogen bond of an alkyl halide, or similar, that is further mediated by the presence of a copper catalyst and a suitable ligand. The cleavage results in a copper(II) complex and an alkyl radical that may undergo deactivation, propagation with monomer units, or irreversibly terminate.

In one or more embodiments, DFNs may be functionalized with an amine terminated silane molecule and further functionalized with a reaction initiator through an additional treatment. For example, the DFNs may be modified with amino-silane, such as (3-aminopropyl)triethoxysilane, as shown in FIG. 6A. After annealing the modified DFNs, the modified DFNs can be reacted directly with 2-bromoisobutyryl bromide to form initiator-coated DFNs, as illustrated in FIG. 6B.

This surface treatment with a ATRP initiator may provide for polymerization of polymer brushes on the surface of DFNs. In the present disclosure, polymer brushes may be defined as dense layers of polymer chains bound to a surface, where the distance between grafts is less than the dimensions of the bound polymer. ATRP polymerization processes of the present disclosure may include specific initiators, catalysts, ligands, reducing agents and solvents.

Initiator

Embodiments of the polymerization process of the present disclosure may include any suitable ATRP initiator. An ATRP initiator may be a compound comprising a radically transferable atom or group, such as a chemical molecule with a transferable halogen, that may initiate chain growth. A variety of initiators, such as alkyl halides, have been used in ATRP. Many different types of halogenated compounds may be potential ATRP initiators. In one or more embodiments, the initiator may be one or more of 2-azidoethyl, 2-bromoisobutyrate, bis[2-(2'-bromoisobutyryloxy)ethyl] disulfide, bis[2-(2-bromoisobutyryloxy)undecyl] disulfide, 2-bromoisobutanoic acid N-hydroxysuccinimide ester, 2-bromoisobutyric anhydride, α-bromoisobutyryl bromide, 2-(2-bromoisobutyryloxy)ethyl methacrylate, tert-butyl α-bromoisobutyrate, 3-butynyl 2-bromoisobutyrate, dipentaerythritol hexakis(2-bromoisobutyrate), dodecyl 2-bromoisobutyrate, ethyl α-bromoisobutyrate, ethylene bis(2-bromoisobutyrate), 2-hydroxyethyl 2-bromoisobutyrate, 1-(DL-1,2-Isopropylideneglyceryl) 2-bromoisobutyrate, methyl α-bromoisobutyrate, pentaerythritol tetrakis(2-bromoisobutyrate), 1-(phthalimidomethyl) 2-bromoisobutyrate, poly(ethylene glycol) bis(2-bromoisobutyrate), poly(ethylene glycol) bis(2-bromoisobutyrate), poly(ethylene glycol) methyl ether 2-bromoisobutyrate, poly(ethylene glycol) methyl ether 2-bromoisobutyrate, poly(ethylene glycol) methyl ether 2-bromoisobutyrate, poly(ethylene glycol) methyl ether 2-bromoisobutyrate, propargyl 2-bromoisobutyrate, and 1,1,1-tris(2-bromoisobutyryloxymethyl)ethane. In one or more embodiments, the initiator may be 2-bromoisobutyryl bromide.

Catalyst Complex

In one or more embodiments, the ATRP reaction may be mediated by a complex comprising a catalyst and ligand. The catalyst may be a transition metal. In one or more embodiments, the transition metal catalyst may be a copper (Cu) based catalyst selected from one or more of $CuBr_2$, $CuCl_2$, and mixtures thereof.

The ligand(s) should form a catalyst complex with the catalyst. The ligand for the catalyst metal complex may also facilitate removal of the transition metal from the organic phase after the reaction has been completed. The ligand may be selected from one or more of 4,4-di(5-nonyl)-2,2'-bipyridine (dNbpy), 2,2' bipyridyl (bpy), N-butyl-2-pyridylmethanimine, 4,4'-Di-tert-butyl-2,2'-dipyridyl, 4,4'-dimethyl-2,2'-dipyridyl, 4,4'-dinonyl-2,2'-dipyridyl, N-dodecyl-N-(2-pyridylmethylene)amine, 1,1,4,7,10,10-hexamethyltriethylenetetramine, N-octadecyl-N-(2-pyridylmethylene)amine, N-octyl-2-pyridylmethanimine, N,N,N',N'',N''-pentamethyldiethylenetriamine, 1,4,8,11-tetraazacyclotetradecane, N,N,N',N'-Tetrakis(2-pyridylmethyl)ethylenediamine, 1,4,8,11-tetramethyl-1,4,8,11-tetraazacyclotetradecane, tris[2-(dimethylamino)ethyl]amine, tris(2-pyridylmethyl)amine, and tris[((4-methoxy-2,5-dimethyl)-2-pyridyl)methyl]amine.

Reducing Agent

In one or more embodiments, the reducing agent may be one or more of ascorbic acid, stannous compounds, stannous oxalate, sodium sulfite, sodium hydrogen sulfite, inorganic salts comprising a metal ion, phenyl hydrazine or hydrazine, mercaptoethanol, carbonyl compounds that can easily be enolized, acetyl acetonate, camphorsulfonic acid, hydroxyacetone, reducing sugars, monosaccharides, silver metal, glucose and related sugars, tetrahydrofuran, derivatives of such compounds, and mixtures thereof. In one or more embodiments, the reducing agent may be a monomer soluble reducing agent or water soluble reducing agent, such as ascorbic acid, in a water based reaction system, such as a mini-emulsion. In one or more embodiments, the amount of reducing agent in the ATRP reaction may be a suitable amount to regenerate the ATRP activator and to eliminate air or radical traps in the system with only ppm (part per million) levels of added catalyst.

Solvent

One or more embodiments of the method of the present disclosure may be performed in bulk or in a solvent. The solvent may be a protic media or a non-protic media. A protic media may be defined as a media that includes at least one component that is capable of being a proton donor. The protic media may be water and may include at least one alcohol. The alcohol of the protic media may be, for example, methanol, ethanol, propanol, isopropanol, butanol, isobutanol, pentanol, hexanol, heptanol, or mixtures thereof. One or more embodiments of the present disclosure also include polymerizing the radically polymerizable monomers in a non-protic media such as, but not limited to tetrahydrofuran (THF), ethyl acetate, dichloromethane, or the non-protic media may comprise an aromatic solvent, such as, but not limited to, anisole, xylene, benzene, a halogenated benzene derivative, or other nonprotic solvent.

Figure 7:
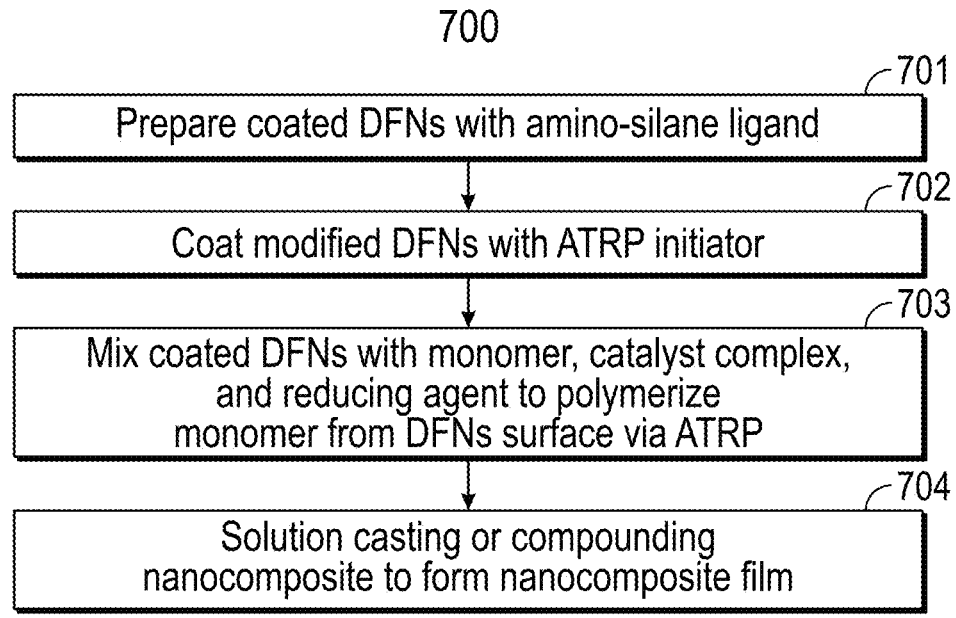
FIG. 7 is a flow chart representation of a method of producing PMMA and DFNs nanocomposites via in-situ ATRP polymerization of methyl methacrylate in solution in the presence of modified DFNs.
Figure 8:
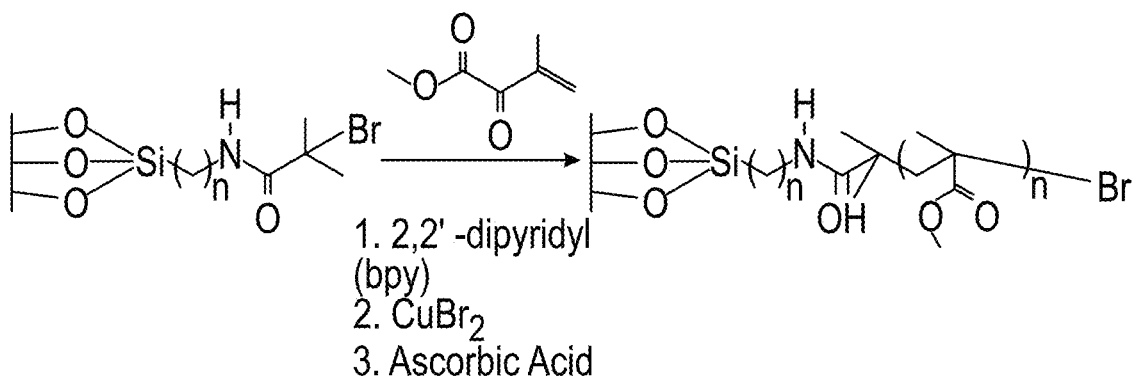
FIG. 8 is a representation of the polymerization of PMMA from the ATRP initiator molecule tethered to the DFNs surface through an organosilane linker molecule to graft PMMA from the DFNs surface through ATRP.

In one or more embodiments, nanocomposite composition may be formed via ATRP. For example, the DFNs may be modified with amino-silane 701, such as (3-aminopropyl) triethoxysilane, as shown in the method 700 of FIG. 7. After annealing the modified DFNs, the modified DFNs can be reacted directly with 2-bromoisobutyryl bromide to form initiator-coated DFNs 702. The final DFNs/PMMA nanocomposites may then prepared by polymer brush growth on nanoparticles using ATRP in the presence of methyl methacrylate monomer. Specifically, the modified and initiator coated DFNs may be mixed with the MMA monomer, catalyst complex, reducing agent, and optional solvent, to polymerize and graft PMMA from the initiator active sites that are tethered to the surface of the individual DFNs 703. For example, the polymerization reaction may be catalyzed through a catalyst complex, such as a 2,2' bipyridyl (bpy) and copper dibromide ($CuBr_2$), in the presence of a reducing agent, such as ascorbic acid, as illustrated in FIG. 8. In the method 700 shown in FIG. 7, in one or more embodiments, the ligand may be added in a suitable amount, or in excess, relative to the amount of catalyst. The ligand may be added in a suitable amount to compensate for competitive complexation of the added transition metal catalyst relative to the monomer/solvent/reducing agent that may each also be added in molar excess. The resulting nanocomposite may then be solution cast or melt-compounded onto a substrate or a glass sheet in a mold to form a film 704. The nanocomposite film formed via polymerization of the reactive solution including the DFNs and methyl methacrylate may be separated from the glass substrate after a reaction period of about 24 hours.

Formation of Film

Film formation techniques may include a solution casting method, an emulsion method, or a melt compound method. In some embodiments, the nanocomposite may be formed into a film using conventional filmmaking techniques, such as melt compounding and extrusion of the nanocomposite composition, to a produce a film of DFNs dispersed in PMMA. In one or more embodiments, films of the nanocomposite compositions may be prepared using continuous or discontinuous extrusion. In some embodiments, raw materials may be added to an extruder, simultaneously or sequentially into the main or secondary feeders, in the form of powder, granules, flakes, or a dispersion in a liquid, such as solutions, emulsions, and suspensions, of one or more components, to produce the extruded films.

In one or more embodiments, methods of preparing the nanocomposite composition may involve a single extrusion or multiple extrusions following the sequences of the blend preparation stages. The polymer and DFN components may be pre-dispersed in prior processes using mixers. In one or more embodiments, the polymerization process may comprise the use of any suitable apparatus or equipment that is known in the art.

A method of melt-compounding film forming can include a melt-extrusion method, a press method, an inflation method, an injection method, a blow method, a stretching method, and other known techniques appreciated in the art. Generally, melt compounding and extrusion methods may produce a film with excellent mechanical strength and surface uniformity. Solution casting and emulsion may aid in inhibiting coloration and minimizing optical defects, such as different film surface matter defects.

The nanocomposite film prepared in accordance with one or more embodiments of the present disclosure may be formed via film forming processes, such as solution casting or extrusion, and also may be formed via co-extrusion in the preparation of the nanocomposite sheet. The nanocomposite film according to the present disclosure may have a thickness of from about 0.1 millimeters (mm) to about 10 mm. In one or more embodiments, the nanocomposite film may have a thickness of from about 0.1, 0.5, 1.0, 1.5, 2.0, 2.5, and 3.0 millimeters, to about 2.5, 3.0, 3.5, 4, 6, 8, and 10 mm, where any lower limit may be combined with any mathematically feasible upper limit. The nanocomposite compositions of the present disclosure are prepared to include transparent robust films of DFNs in a PMMA polymer matrix to provide a front cell sheet with high transparency and improved scratch resistance without diminishing the mechanical properties of the PMMA polymer matrix.

EXAMPLES

The following examples are illustrative and should not be interpreted as limiting the scope of the present disclosure.

In the following examples, a number of polymer samples are analyzed to demonstrate the changes in properties associated with polymer compositions prepared in accordance with the present disclosure.

Sample 1: Preparation of Dendritic Fibrous Silica Particles

Dendritic fibrous silica particles were prepared by a hydrothermal process. A solution composed of tetraethoxysilane (20 grams) (g), cyclohexane (240 mL), and 1-pentanol (12 milliliters) (mL), was prepared and stirred for 30 min (minutes). Concurrently, an additional solution including cetyltrimethylammonium bromide (8 g), urea (4.8 g), and deionized water (240 mL), was mixed and stirred for 30 min. The tetraethoxysilane solution was then added into the cetyltrimethylammonium bromide solution and stirred for 1 hour (h). The solution was then transferred into an autoclave and heated in an oven at 125° C. for 4 to 6 h. The autoclave was then gradually cooled. The silica particles were collected by repeated centrifugation in deionized water and ethanol. After being dried overnight at room temperature, the synthesized DFNs were calcined under continuous air flow at 550° C. for 4 h yielding a pure white powder. The formed DFNs were further characterized by TEM and determined to have an average diameter ranging from 380 to 460 nm.

Sample 2: Modification of DFNs

Silica DFNs were modified with a methacryloxypropyltrimethoxysilane (MPTMS) coating to furnish the DFNs with a reactive site for further polymer attachment. The silica DFNs were dried for about an 1 h at 100° C. and then immediately moved into a round-bottom flask. A solution of about 10 to 20% volume by volume (v/v %) of MPTMS in toluene was prepared and added to the flask. The resulting mixture was refluxed for about a day. The suspension was cooled and solid product was isolated from the solution by repeated centrifugation using polar and non-polar solvents. The silica DFNs powder was dried ground to a fine powder.

Sample 3: Modification of DFNs

Silica DFNs were modified with a (3-aminopropyl)triethoxysilane coating to furnish the DFNs with a reactive site for further polymer attachment. The silica DFNs were dried for about an 1 h at 100° C. and then immediately moved into a round-bottom flask. A solution of about 10 to 20% volume by volume (v/v %) of (3-aminopropyl)triethoxysilane in toluene was prepared and added to the flask. The resulting mixture was refluxed for about a day. The suspension was cooled and solid product was isolated from the solution by repeated centrifugation using polar and non-polar solvents. The obtained silica DFNs powder was dried ground to a fine powder.

Sample 4: Functionalization of Modified DFNs with ATRP Initiator

After modification with (3-aminopropyl)triethoxysilane as described in Sample 3, the functionalized DFNs may be further reacted with an initiator to form ATRP initiator coated DFNs. To functionalize the modified DFNs, modified DFNs are first dried at about 110° C. in air at atmospheric pressure for at least 30 minutes. After a step of annealing, the modified DFNs are then reacted with 2-bromoisobutyryl bromide (BIBB) in the presence of anhydrous tetrahydrofuran and triethylamine. The reaction mixture is agitated for at least one hour. The resulting product is then washed with tetrahydrofuran, methanol, and deionized water, before drying under a nitrogen gas stream.

Sample 5: Preparation Nanocomposite Film Via Atom Transfer Radical Polymerization Following the preparation of the initiator coated DFNs, the initiator coated DFNs are then placed in a flask that is deoxygenated with nitrogen purging or vacuum/nitrogen cycling. Next, about 1 mmol (millimole) of $CuBr_2$, 6.96 mmol of 2,2'-dipyridyl (bpy), and 8.82 mmol of sodium L-ascorbate, are added to the flask comprising the initiator coated DFNs. The flask is again purged with nitrogen. The mixture is then stirred at room temperature. In a separate sealed round-bottomed flask, a mixture of methanol, water, and methyl methacrylate, at a mixture ratio of 4:1:5 is mixed and deoxygenated using bubbling nitrogen for 10-15 minutes. The resulting solution is then slowly added to the mixture comprising the ATRP initiator coated DFNs, $CuBr_2$, 2,2'-dipyridyl (bpy), and sodium L-ascorbate. The polymerization reaction is then conducted. After the desired polymerization time has elapsed, the samples are removed and washed first with methanol and water and then with tetrahydrofuran (THF) to remove excess PMMA.

Scratch Testing

A scratch test of the prepared samples was conducted using a pencil scratch tester according to ASTM D3363-05 with a load of 500 g, a pencil angle of 45°, and a scratch speed of 1 mm/s (millimeter per second). In this test, a set of calibrated wood pencils are employed to determine the film hardness on a scale of 6B 5B 4B 3B 2B B-HB-F-H-2H-3H-4H-5H-5H, where 6B is the softest and 6H is the hardest in terms of sample film hardness.

Comparative Example 1

A comparative Example of PMMA was prepared as described previously without the addition of the DFNs. The PMMA film hardness was tested as described previously, according to ASTM D3363-05, to measure the hardness of the prepared PMMA film without the DFNs.

Scratch testing included a first sample of a Comparative Example 1 (only PMMA) that was tested according to the previously described testing method. The film comprising only PMMA was shown to have a scratch value of 5B. In comparison, nanocomposite films comprising about 1% fibrous silica, which were prepared as described in Sample 5, showed a significant increase in scratch resistance corresponding to a pencil hardness value of H.

Although the preceding description has been described with reference to particular means, materials and embodiments, it is not intended to be limited to the particulars disclosed; rather, it extends to all functionally equivalent structures, methods and uses, such as those within the scope of the appended claims.

The presently disclosed systems, apparatuses, methods, processes and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

The term "radical" encompasses all non-ionic active radical based species formed by homolytic cleavage of a bond and is not limited to a carbon centered free radical that does not interact with any other component in the system.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

The invention claimed is:

1. A nanocomposite composition comprising:
   dendritic fibrous nanoparticles, wherein the dendritic fibrous nanoparticles have a diameter ranging from 50 nm (nanometers) to 500 nm; and
   a polymer matrix comprising poly(methyl methacrylate) (PMMA), wherein the dendritic fibrous nanoparticles are dispersed within the polymer matrix, and where the PMMA is bound to the surface of the dendritic fibrous nanoparticles.

2. The nanocomposite composition of claim 1, wherein the dendritic fibrous nanoparticles are comprised of one or more oxides selected from the group consisting of silica, titanium oxide, zinc oxide, zirconium oxide, and combinations thereof.

3. The nanocomposite composition of claim 1, wherein the nanocomposite composition includes the dendritic fibrous nanoparticles in an amount ranging from 0.1 to 5.0 by weight percent (wt %) of the nanocomposite composition.

4. The nanocomposite composition of claim 1, wherein the nanocomposite composition comprises PMMA in an amount ranging from 95 wt % to 99.9 wt %.

5. The nanocomposite composition of claim 1, wherein the nanocomposite composition is a film.

6. The nanocomposite composition of claim 5, wherein the film has a thickness ranging from 0.1 millimeters (mm) to 5 mm.

7. The nanocomposite composition of claim 5, wherein the film is optically transparent.

8. The nanocomposite composition of claim 5, wherein the film has an improved scratch resistance compared to polymer films comprising PMMA without the dendritic fibrous nanoparticles.

9. The nanocomposite composition of claim 1, wherein the PMMA is a copolymer and comprises one or more comonomers selected from the group consisting of n-butylacrylate, ethyl acrylate, 2-ethylhexyl acrylate, ethyl methacrylate and butyl methacrylate, fluorinated acrylics, styrene, acrylamide, acrylonitrile, and combinations thereof.

* * * * *